Dec. 16, 1952     T. O. ZSCHOKKE ET AL     2,621,513
MILES PER GALLON INDICATOR APPARATUS
Filed Oct. 5, 1948
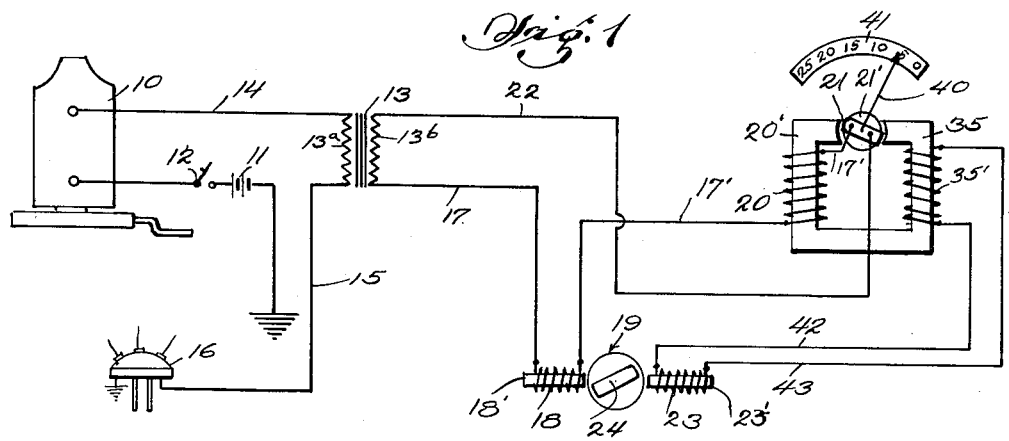
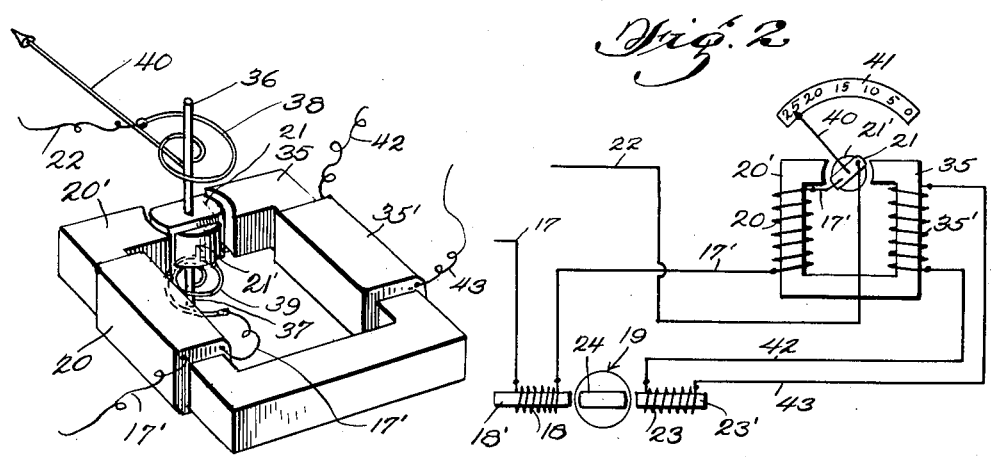
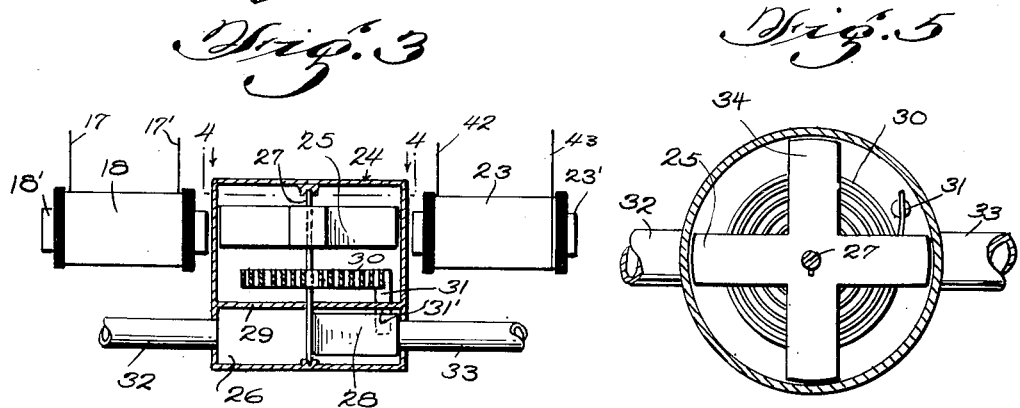
INVENTORS
Theodore O. Zschokke
Herman H. Chappell
W. J. Eccleston
ATTORNEY Patented Dec. 16, 1952

2,621,513

UNITED STATES PATENT OFFICE 2,621,513

MILES PER GALLON INDICATOR APPARATUS

Theodore O. Zschokke, Perris, and Herman H. Chappell, Sunnymead, Calif.

Application October 5, 1948, Serial No. 52,966

5 Claims. (Cl. 73—114)

(Granted under the act of March 3, 1883, as amended April 30, 1928; 370 O. G. 757)

The invention described herein, if patented, may be manufactured and used by or for the Government for governmental purposes without the payment to us of any royalty thereon.

This invention relates to an improved apparatus or system for operating an indicator, and more particularly is illustrated with respect to an improved miles-per-gallon indicator device and its mode of operation whereby the ratio of distance traveled or engine output over fuel consumed or energy input is directly indicated as operating efficiency.

It is an object of this invention to provide an improvement in a metering device whereby an alternating current modulated by fuel flow opposes a primary alternating current controlled by engine speed to operate an indicator which registers travel mileage relative to gas consumption.

It is another object of this invention to provide a variable indicator system for showing the ratio of fuel consumption with respect to power output as determined by engine speed.

A further object of this invention is to provide means for transposing direct current to alternating current and utilizing different frequencies in the alternating current in opposed relationship to indicate the efficiency of a mechanism with which it is associated.

Further objects and advantages of this invention will be apparent from the following disclosure and the accompanying drawings, wherein:

Fig. 1 is a schematic plan view of a metering device;

Fig. 2, a partially modified view of Fig. 1;

Fig. 3, a plan view in partial cross-section of an indicator needle operating coil;

Fig. 4, a partial cross-sectional view of a current modulator controlled by fluid flow; and Fig. 5, an open-top plan view on line 4—4 of Fig. 3.

Referring to the drawings, a spark coil 10, of the character utilized with a fuel-consuming engine, is connected with a suitably grounded battery 11 by closure of ignition key 12, or other switching member of suitable character. The circuit from the spark coil 10 to ground is completed by connecting the primary 13a of a conventional transformer 13 in series by means of conductors 14 and 15 with the spark coil 10 and the distributor of a conventional type 16.

The transformer 13 has a turn ratio between its primary coil 13a and secondary coil 13b to produce the desired working voltage, which might be 25 to 30 volts. The secondary coil 13b of the transformer 13 is connected by conductor wire 17 to coil 18, of fuel flow modulator 19, to coil 20 and to the rotatable differential indicator coil 21 by conductor wire 17' and return conductor wire 22.

The fuel flow modulator 19 consists of two coils 18 and 23, their cores 18' and 23', and a non-magnetic fuel-tight case 24 enclosing a moving core 25 and vane assembly in fluid space 26. The moving core 25, of soft laminated iron, is mounted on a vertical shaft 27, which is pivotally supported at its ends by the casing 24. The shaft 27 has a vane 28 mounted on its end opposite the core 25. Above the vane 28 is a partition 29, which preferably confines fuel flow to the space 26, where it can act on the vane 28 to move core 25. However, fuel can freely enter the rest of the space enclosed in case 24, where its presence has no effect on the mechanism. A hair spring 30 is attached to the shaft 27 at one end and to a post 31 at the other. The hair spring 30 returns the vane 28 to stop 31' when there is no fuel flow. The stop 31' may be an independent element or an end of post 31, which extends through the partition plate 29. Fuel from a pump or other source enters the space 26 through pipe 32 and leaves through pipe 33 to go to a carburetor. Flow of the fuel displaces the vane 28 against the resistance offered by the hair spring 30, thereby moving core 25 in proportion to fuel flow and varying its alignment with cores 18' and 23' for the purposes hereinafter described. This core is dynamically balanced by non-magnetic material 34.

Some modification of the above-described fuel flow modulator 19 may be provided by uniting into one part the functions of the moving core 25 and the vane 28. That is, the vane 28 may be formed of material capable of conduction magnetism and mounted directly between the cores 18' and 23' in a manner, as heretofore indicated, to produce displacement or variable magnetism proportional with fuel flow.

In Fig. 5 is shown the relationship of the core 25, counterweight 34, hair spring 30 and hair spring attachment post 31, as above described.

The differential indicator, as shown in Fig. 3, consists of an A. C. meter with a conventional d'Arsonval movement. The "C" core is made up of laminated soft iron. On its two limbs 20' and 35 are wound coils 20 and 35'. Coil 35' has more turns of smaller wire than coil 20. The moving coil 21 is suspended on pivots 36 and 37, resting in bearings (not shown), supported, for example, by a casing structure (not shown). Mounted in the center of the moving coil 21, likewise supported by the casing structure (not shown), is a stationary pole piece 21' of soft iron to concentrate the magnetic flux through the air gap between limbs 20' and 35. Coil 35' is connected in series with coil 23 to form an independent circuit. Attached to the two pivots 36 and 37 are hair springs 38 and 39, which serve to return the moving coil 21 and pointer 40 to an "off" position. The hair springs 38 and 39 offer resistance to movement of the moving coil 21 and act as conductors for a current going to coil 21 through conductor wiring 17' and 22. Pointer 40 swings over a scale 41, suitably marked in any convenient units, such as miles per gallon. The units range from 0 on the right to a maximum on the left. Beyond the last numeral on the left is an "off" position, where the pointer rests when the instrument is not energized. The scale can be calibrated for more than one gear ratio to allow for "high" and "overdrive" on trucks and buses, if desired.

The flow of the electricity through the various elements is as follows. The battery 11 energizes the D. C. circuit when the key 12 is closed. With the engine running, the D. C. is interrupted by the distributor. The resulting pulsating D. C. will develop an alternating current in the secondary of the transformer 13. This current, hereinafter called the speed signal, varies its current and cycle with speed. The voltage is constant. The speed signal is fed in series through coils 18, 20 and 21, developing magnetism in their respective cores. Core 18' magnetizes moving core 25, and in turn core 23'. The collapse and build-up of the magnetic field in core 23' produces a current in coil 23, which hereinafter is called the modulated signal. Its cycle is the same as that of the speed signal. Its voltage is dependent upon the turn ratio between coils 18 and 23 which is chosen to develop maximum magnetic effect in coil 35', and its current is dependent upon the position of the moving core 25. Because the core 25 is moved in and out of alignment with cores 18' and 23' with changes in fuel flow, the current induced in coil 23 will be proportionally changed. The current of the modulated signal is, therefore, proportional to fuel flow. The current and cycle of the speed signal is proportional to engine speed and, in turn, to miles traveled.

The two signals are integrated in the indicator in the following manner. Coils 20 and 21 are energized by the speed signal. Without the modulated signal the moving coil would be moved over to the right, the distance moved being proportional to the strength of the signal and to the speed. Coil 35' is energized by the modulated signal induced from core 23' through coil 23 and current conductor wires 42 and 43. It is wound in such a manner that at any given instant its magnetic polarity at the air gap is the same as that of coil 20, thus buffering coil 20 and tending to swing coil 21 to the left. As the amount of current in the modulated signal is always less than that in the speed signal, due to transformer losses and to displacement of core 25, the magnetic effect of coil 35' is always less than that of coil 20. The hair springs 36 and 37 are of a strength to compensate partially for the difference due to current loss. With increases in fuel flow there will be a decrease of magnetic flux in core 23', a decrease in modulated signal strength and, in turn, less buffering action so that coil 21 will swing further to the right. Thus, fuel flow changes with a constant speed signal affect the indicator. The current and cycle of the speed signal vary with the speed of the engine. As changes in current in the speed signal also produce similar changes of current in the modulated signal, these changes will neutralize and have little effect on the indicator. Changes in cycle will affect the indicator in this way. Coil 20 has fewer turns of larger wire than coil 35' and, therefore, has a lower impedance to a given cycle of current than coil 35'. At lower frequencies coil 20 is more efficient than coil 35' at creating magnetism because it has a lower impedance. Impedance increases with increases in frequency, but at different rates for different types of coils and cores. The relationship of the coils and cores of the indicator is such that coil 20 will gain in impedance at a faster rate with increase in frequency in the working range of speeds than will coil 35'. As speed increases coil 20 will lose in efficiency at a faster rate than will coil 35'. Therefore, speed changes without fuel flow changes will affect the indicator. Increasing speed will allow coil 35' to buffer coil 20 more effectively, forcing coil 21 to the left. These combinations of signal changes are integrated by the primary integrating circuit 17, 17' and 22 and the secondary integrating circuit 42, 43, as described, into a reading which is a measure of the distance traveled per unit of fuel consumed.

As an operative illustration, it may be presumed that, when used with a motor vehicle on the highway running at normal speeds, the setting of core 25 will be proportional to gas consumption and the current induced by the motor will maintain indicator needle 40 adjusted at the point of normal efficiency of the motor. However, in the event that pull is placed on the motor so that fuel consumption increases without change in speed, a further displacement of core 25 occurs, reducing the induced current to coil 35', which then permits coil 20 to dominate rotating coil 21, which positions the indicator needle 40 at an indicating point showing reduced efficiency on scale 41. When the motor again resumes its normal travel, without excessive pull, and with or without a change in fuel consumption, the increased motor speed will induce a stronger current through coil 35', in the manner described, to again afford a buffering or counter-magnetism to the core 20', causing rotation of coil 21, which moves indicator needle 40 to register increased efficiency on scale 41. This efficiency may be expressed in miles per gallon as indicated, or other unit, as desired.

Having thus described a system which is the integrating of two sources of signals in one indicator, it is possible to incorporate resistors, condensers and/or chokes between the coils 20' and 35' to accentuate the differences in current and magnetism due to changes in cycles. Such differences in current being determined by impedance resistance including such factors as various reactances, including inductive reactance, capacity reactance and non-inductive resistances. Further, the system may be adapted to different usages by proper calibration of the indicator and using resistors in either shunt or series with the conductor coils. Such modification may also be made by modulating the phase of the modulated signal by replacing coils 18 and 23 with a variable condenser. With this latter change, a speed signal will be produced and varied by the current output changes produced in transformer 13 and the modulated signal will be the output of the condenser, so that changes in condenser position produce a current in coil 35' more or less in step with the current in coil 20, producing a movement of the indicator proportional to the condenser changes.

Accordingly, modifications, adaptation and uses may be made in the system described which are believed to fall within the scope of the claim.

We claim:

1. An electrical indicating system comprising a rotary member for operating a needle of a measuring instrument, a first winding carried by the rotary member to turn therewith, means to apply a torque in one direction to the first winding including a primary winding and core, means to apply a torque in an opposite direction to the first winding including a secondary winding and core, a primary circuit connected with the first winding and primary winding and including an electromagnetic device, a secondary circuit connected with the secondary winding and including an electromagnetic device arranged near and spaced from the first named electromagnetic device, a movable element of magnetically permeable material arranged between said electroagnetic devices to vary the intensity of the magnetic field between the same, means responsive to a first variable to move said element, and electrical means responsive to a second variable for inducing in the primary circuit a pulsating current which varies as a function of said second variable.

2. An electrical indicating system comprising a rotary member for operating a needle of a measuring instrument, a first winding carried by the rotary member to turn therewith, means to apply a torque in one direction to the first winding including a primary winding, means to apply a torque in an opposite direction to the first winding including a secondary winding, a primary circuit connected with the first winding and primary winding and including an electromagnetic coil and core, a secondary circuit connected with the secondary winding and including an electromagnetic coil and core arranged near and spaced from the first-named coil and core, a pivotal element of material permeable to magnetism arranged between said electromagnetic coils and cores to vary the air gap between the same, vane means connected with the pivotal element so that the element will turn in response to flow of a liquid against the vane, and electrical means responsive to a second variable for inducing in the primary circuit a pulsating current which varies as a function of said second variable.

3. A miles-per-gallon indicator comprising a rotary member for operating a needle of a measuring instrument, a first winding carried by the rotary member to turn therewith, means for applying a torque in one direction to the first winding including a primary winding, means for applying a torque in an opposite direction to the first winding including a secondary winding, a primary circuit connected with the first winding and primary winding and including an electromagnetic device, a secondary circuit connected with the secondary winding and including an electromagnetic device arranged near and spaced from the first-named electromagnetic device, an element arranged between the electromagnetic devices and movable in response to fuel flow to vary the magnetic field between the devices, a transformer having a secondary coil connected in said primary circuit and a primary coil, and circuit means including a source of current and an interrupter connected with the primary coil of the transformer for inducing a pulsating current in the primary circuit which is variable with engine speed.

4. Indicating means comprising a rotary member for connection with an indicating needle, a single coil only carried by the rotary member to turn therewith, first electrical means to apply a torque in one direction to the said coil, second electrical means to apply a torque in an opposite direction to the coil, a primary alternating current circuit connected with said coil and first electrical means and including a first electromagnet, a secondary alternating current circuit connected with the second electrical means and including a second electromagnet arranged near and spaced from the first electromagnet, a liquid conduit for receiving a variable flow of liquid, a vane disposed within the conduit in the path of flow of the liquid to be moved thereby, a shaft connected with the vane for rotation when the vane is moved by the liquid, an element permeable to magnetism secured to the shaft for rotation therewith and disposed between the first and second electromagnets to vary the air gap between the same whereby the current flowing in said secondary circuit is varied, and electrical means responsive to a second variable for inducing in the primary circuit a pulsating current which varies as a function of said second variable.

5. Indicating means comprising a measuring instrument having a rotary armature carrying a first winding, magnetic pole pieces arranged upon opposite sides of the armature, a primary winding for one of said pole pieces, a secondary winding for the other pole piece, a primary alternating current circuit connected with the first winding and primary winding, a secondary alternating current circuit connected with the secondary winding, a first electromagnet connected in the primary circuit, and a second electromagnet connected in the secondary circuit near the first electromagnet and spaced therefrom, a rotary core section arranged between the first and second electromagnets for increasing the air gap between the electromagnets when turned at an angle thereto, a conduit for a liquid having a variable rate of flow, a vane arranged within the conduit in the path of travel of the liquid, a shaft connecting the vane and core section so that movement of the vane will turn the core section, a transformer having a secondary coil connected in said primary circuit and a primary coil, and circuit means including an interrupter responsive to a second variable and connected with the primary coil of the transformer for supplying a pulsating current to the same vehicle varies as a function of said second variable.

THEO. O. ZSCHOKKE.
HERMAN H. CHAPPELL.

REFERENCES CITED

The following references are of record in the file of this patent:

UNITED STATES PATENTS

| Number | Name | Date |
|---|---|---|
| 2,422,240 | Jackes | June 17, 1947 |
| 2,454,393 | Leonard | Nov. 23, 1948 |